United States Patent [19]
Simpson

[11] 3,912,955
[45] Oct. 14, 1975

[54] ELECTRIC DYNAMO

[76] Inventor: John R. Simpson, 3 Applecrest Road, Weston, Mass. 02193

[22] Filed: Nov. 19, 1973

[21] Appl. No.: 417,403

[52] U.S. Cl.................................. 310/42; 310/216
[51] Int. Cl.$^2$ ........................................ H02K 1/18
[58] Field of Search.... 310/194, 260, 270, 216–218, 310/254–259, 179, 42

[56] References Cited
UNITED STATES PATENTS

| | | | |
|---|---|---|---|
| 2,247,890 | 7/1941 | Reardon | 310/216 |
| 2,445,986 | 7/1948 | Adamson | 310/42 |
| 2,547,599 | 4/1951 | Roters | 310/216 X |
| 2,565,530 | 8/1951 | Smith | 310/216 X |
| 2,711,008 | 6/1958 | Smith | 310/216 X |
| 2,970,237 | 1/1961 | Kent | 310/260 |

*Primary Examiner*—Donovan F. Duggan
*Attorney, Agent, or Firm*—Schiller & Pandiscio

[57] ABSTRACT

An electric dynamo has a winding of insulated electric wire secured in a completed inner stator assembly which is inserted and enclosed by an outer stator. A winding support fixed at each inner stator end shields the winding that is external to the inner stator from a rotor. The insulated wire strands enter slots in the outer surface of the inner stator. At an end of the completed inner stator assembly, most of the winding externally of the inner stator passes in a straight or chord line across a winding support as it extends from one slot to another.

9 Claims, 12 Drawing Figures

ELECTRIC DYNAMO

One object of my invention is to provide substantial savings both in input power, and in material used in electric dynamos. Since power conversion is coupled to the electric current in the wires that are in the slots, shortening the wire portions externally of the slots provides a saving in wire length as well as a reduction in power loss due to current flowing through less wire and thus less resistance. The wire length reduction per half turn results from the difference between an arc and its chord.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my invention.

Figure 1:
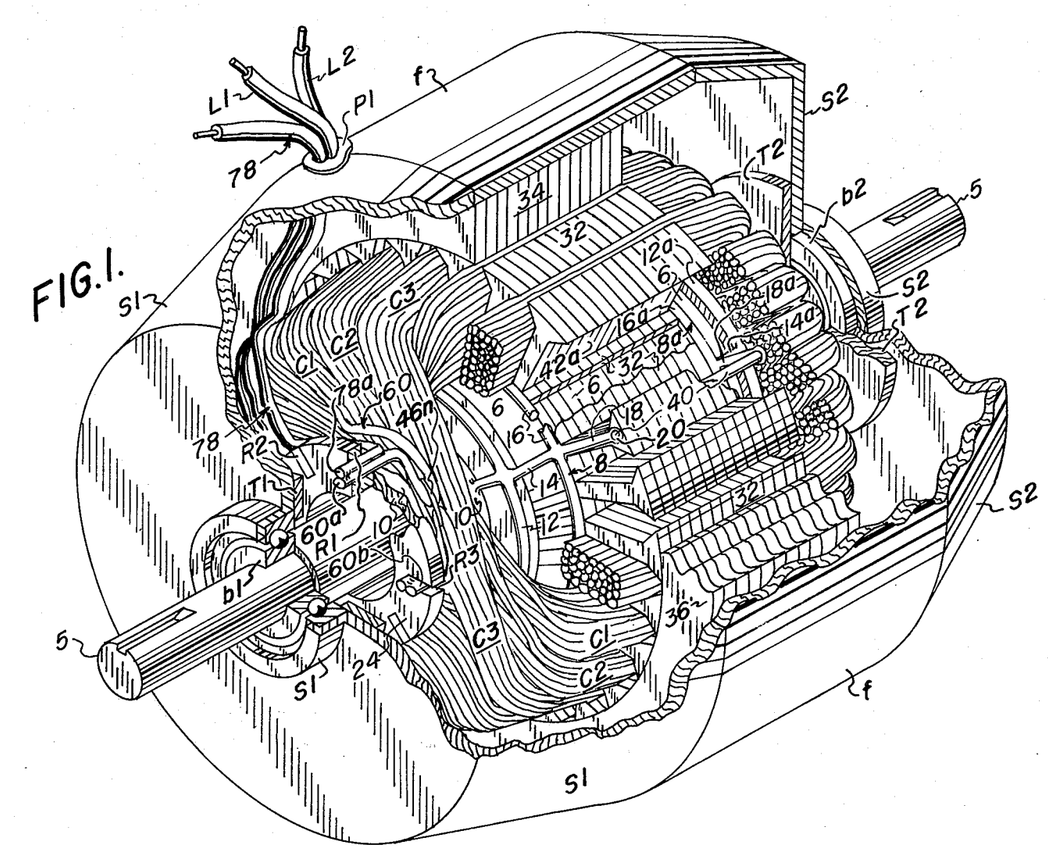
FIG. 1 is a perspective broken-away view of my chord span winding dynamo, partly in section.

As illustrated in FIG. 1, my chord span winding dynamo has a frame $f$ bounded by two bearing supports S1 and S2. Bearings $b1$ and $b2$ are held in place against bearing supports S1 and S2 respectively by retainers T1 and T2 respectively and shaft 5.

Figure 2:
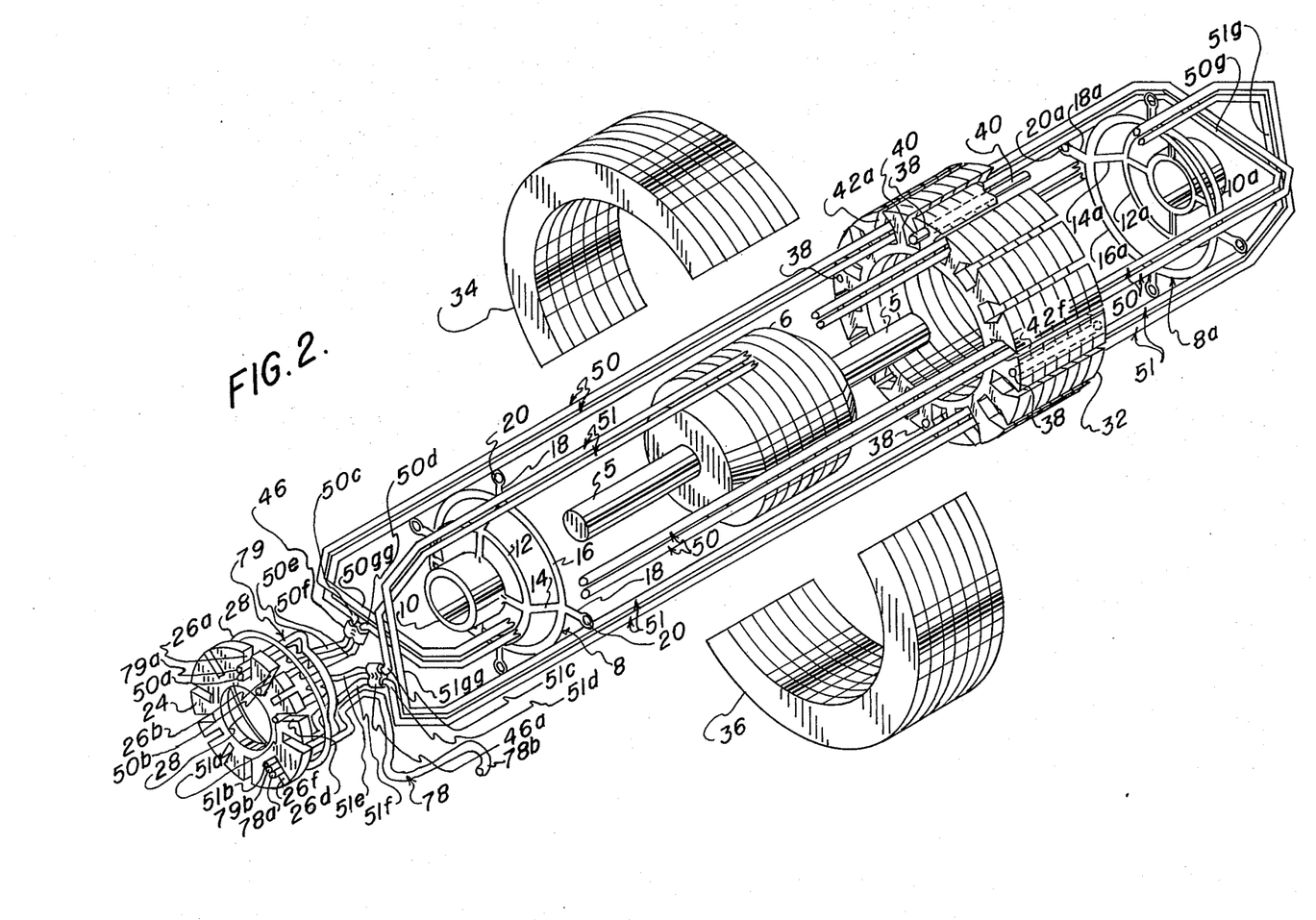
FIG. 2 is an exploded, perspective partly broken-away view of my chord span winding dynamo.

As illustrated in FIG. 1 and FIG. 2, said shaft 5 is fixed onto rotor 6. Said rotor 6 is rotatably enclosed by an inner stator 32 later referred to. At one end portion of said inner stator 32 is a winding support 8 having a hub 10, inwardly of which is an inner ring 12 joined to said hub 10 by angular connector arms 14 which continue to a peripheral rim 16. Said connector arms 14 also have extension portions 18 beyond said rim 16 which have end holes 20 therethrough later referred to. A wire receiver ring 24 is fixed on said hub 10. It has insulated, peripheral slots such as R3 in FIG. 1 and 26$a$ in FIG. 2 to receive insulated wire strands such as 60$b$ in FIG. 1 and 50$a$ in FIG. 2 later referred to. A retainer 28, shown in FIG. 2, encircles and retains said insulated strand ends such as 60$a$ in FIG. 1 and 50$a$ in FIG. 2 in said peripheral slots such as R1 in FIG. 1 and 26$a$ in FIG. 2. The reason said slot 26$a$ and said strand end 50$a$ are not shown in FIG. 1 is because said strand end 50$a$ represents the first laid strand end of the winding whereas said strand end 60$a$ is the start end of the last laid strand in the winding thereby strand 50$a$ is under many strands. A clamp such as 46$n$ in FIG. 1, and 46 in FIG. 2, secures strand 60 in FIG. 1 and 50 in FIG. 2.

A stator is composed of an inner stator 32 and an outer stator shown formed by two sections 34 and 36 that removably embrace said inner stator 32. Said inner stator 32 rotatably receives said rotor 6. Around the peripheral surface of said inner stator 32 are relatively deep insulated grooves or slots such as 42$a$, later referred to.

As illustrated in FIG. 1 said strand 60 is formed into a group of coils C1, C2, C3 where said strand end 60$a$ is the start strand end of said coil C1 and finish strand end 60$b$ is the finish strand end of said coil C3. Said strand end 60$a$ is electrically connected to line lead end 78$a$ while in said insulated receiver slot R1, line leads L1, L2 and 78 pass through strand electric insulation protector P1.

Another winding support 8$a$, similar to said winding support 8, has a hub 10$a$, shown in FIG. 2, inwardly of which is an inner ring 12$a$ joined to said hub 10$a$ by angular connector arms 14$a$ which continue to a peripheral rim 16$a$. Said arms 14$a$ have extension portions 18$a$ beyond said rim 16a which have end holes 20$a$, shown in FIG. 2, therethrough. Said shaft 5 rotatably extends through said hub 10$a$.

Joiner rods 40, only one is shown, are insulated and carry no current. Said joiner rods 40 are inserted into holes 38, shown in FIG. 2, in said inner stator 32 and project out of said holes 38 and into both said holes 20 and 20$a$. This assembles said inner stator 32, said support 8 and said support 8$a$.

Both said winding supports 8 and 8$a$ are retained against said inner stator 32 in any well known manner such as deformation of the projected ends of said joiner rods 40 against said arms 18 and 18$a$, or by adhesive between said inner stator 32 and both said arms 18 and 18$a$.

Figures 3, 4:
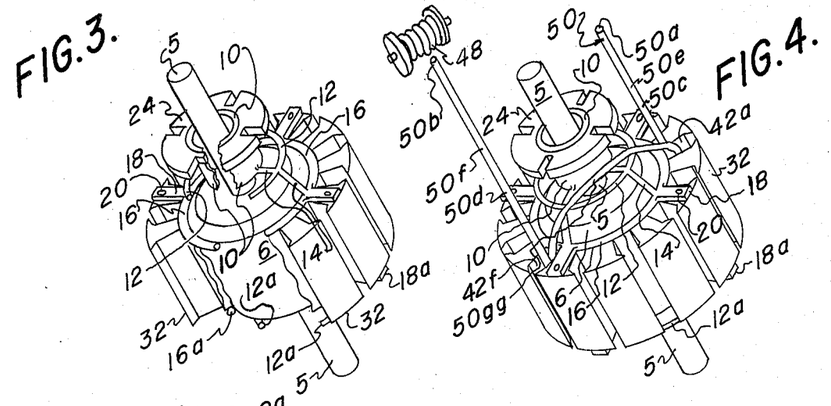
FIG. 3 is a perspective broken-away view of my chord span winding dynamo assembly, having no winding and no outer stator, prior to receiving the chord span winding.
FIG. 4 is a perspective view of my chord span winding dynamo assembly having no outer stator and having received two turns of an insulated wire strand.
Figure 5:
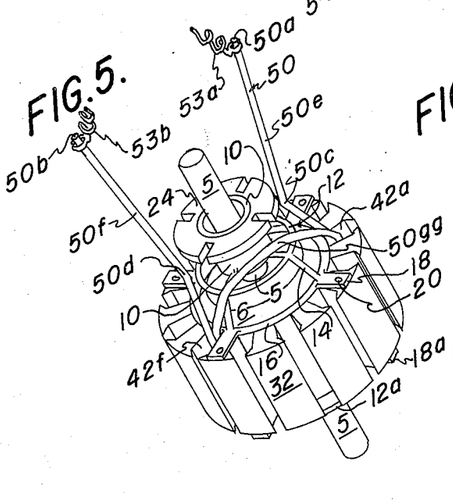
FIG. 5 is a perspective view of my chord span winding dynamo assembly having no outer stator and having both insulated wire strand intermediate portions pulled slightly toward each other.
Figure 6:
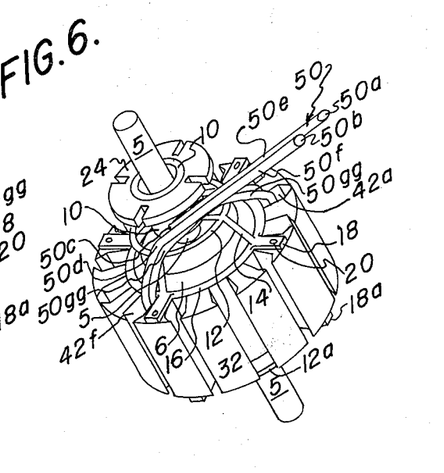
FIG. 6 is a perspective view of my chord span winding dynamo assembly having no outer stator and having both insulated wire strand intermediate portions pulled tautly together.
Figure 7:
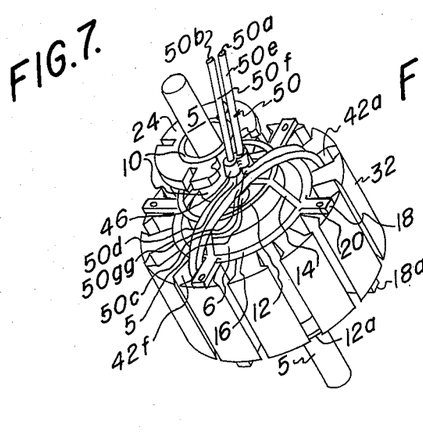
FIG. 7 is a perspective broken-away view of my chord span winding dynamo assembly having no outer stator and having both insulated wire strand intermediate portions secured together by a clamp.
Figure 8:
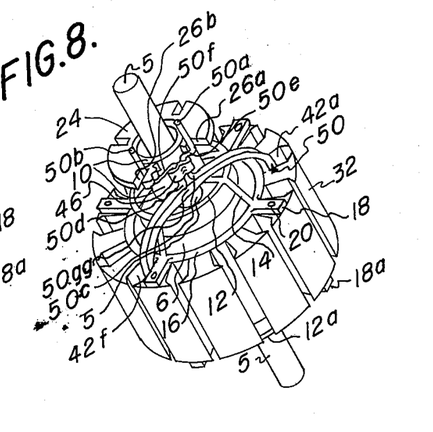
FIG. 8 is a perspective broken-away view of my chord span winding dynamo assembly having no outer stator and having both insulated wire strand ends extending into different receiver slots, the latter being shown broken away.

As illustrated in FIG. 3, the assembly of the chord span winding dynamo, prior to winding has both said winding supports 8 and 8$a$ securely mounted to said inner stator 32, all of which enclose said shaft mounted rotor 6. Said wire receiver ring 24 is tightly fitted onto said hub 10.

In winding as shown in FIG. 4 to FIG. 8 said insulated wire strand 50 commences in a taut manner at one end portion 50a adjacent to, but separated from said receiver 24, being firmly held in a well known way as by an exterior clamp not shown. Said insulated wire strand 50 is laid in and extends through said insulated inner stator slot 42a and extends over said peripheral rim 16a, over a portion of said inner ring 12a, then by said hub 10a in a chord-like manner as shown at 50g. Then it passes over another portion of said inner ring 12a and another portion of said peripheral rim 16a and in an insulated inner stator slot 42f. Then passes over said peripheral rim 16, then over said inner ring 12, by said hub 10 in a chord-like manner as shown at 50gg, then back over another portion of said inner ring 12 and another portion of said rim 16, and then it returns through said insulated inner stator slot 42a to said rim 16 a. Thereafter winding is repeated until sufficient winding has passed through said insulated slots such as 42a and 42f. For example, there may be fifteen strand turns in said insulated inner stator slots, such as 42a and 42f constituting a coil. Insulated wire strands such as 50 can be located in more than two insulated inner stator slots, such as said coil group composed of said coils C1, C2 and C3.

When sufficient winding of said insulated wire strand 50 is completed, the finish end 50b is firmly held taut while it is cut from a wire source 48 as illustrated in FIG. 4.

The next step in turn is to bring physically together, but not electrically, two insulated wire strand portions 50c and 50d of said insulated wire strand 50 and secure them tautly together as by said clamp 46, or they may be taped together, or bonded together by adhesive. For example, in FIG. 5 said start end 50d and said finish end 50b are each held to one end of separate springs 53a and 53b while the other ends of the latter springs will be rigidly secured to a fixture not shown, thus bringing together said portions 50c and 50d to maintain a taut condition of said wire strand 50.

Insulated wire strand portions 50e and 50f of said insulated wire strand 50 are laid over said inner ring 12. Then said insulated wire ends 50a and 50b are individually inserted into insulated receiver slots 26a and 26b respectively as shown in FIG. 2.

Figures 9, 11:
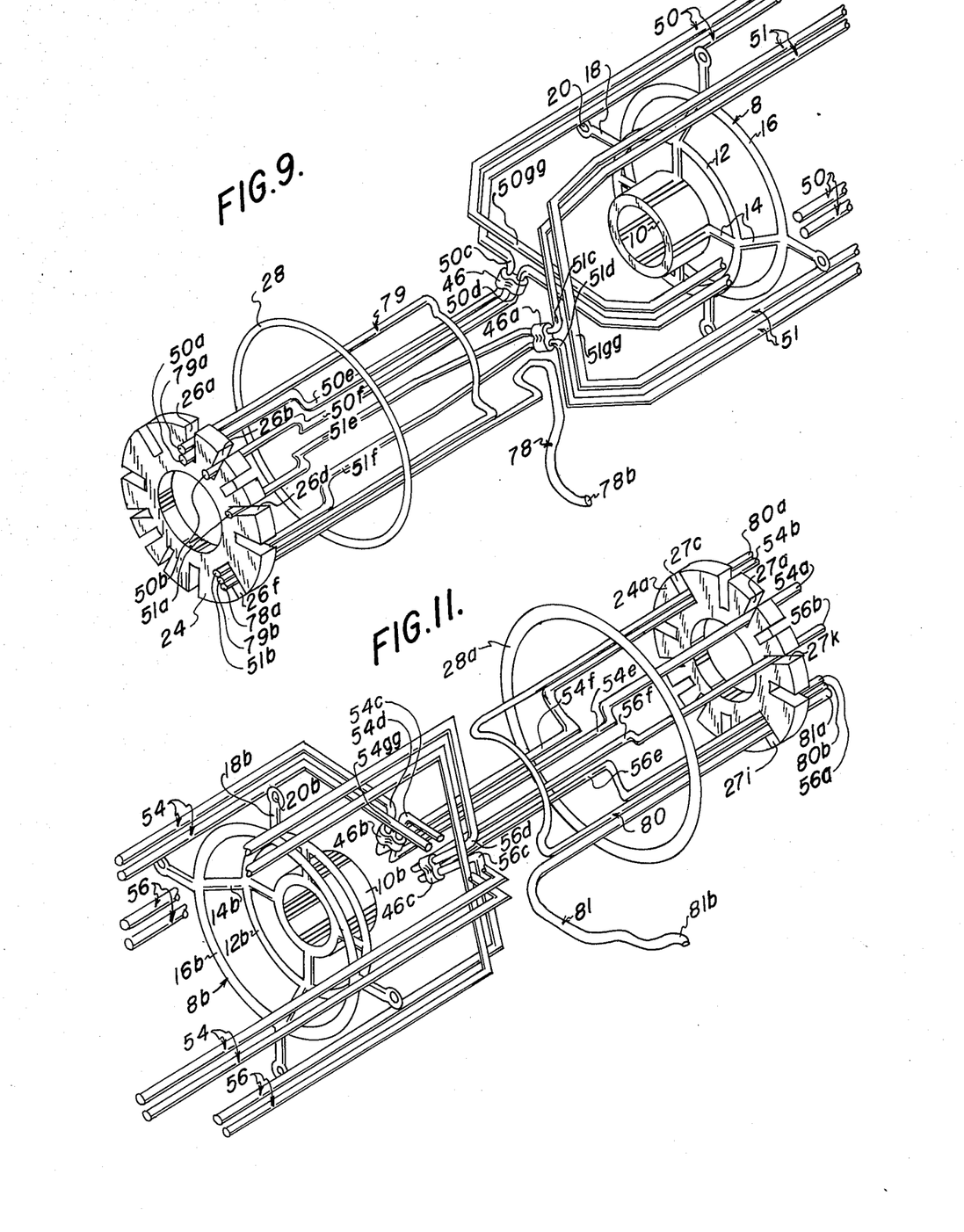
FIG. 9 is an enlarged exploded, perspective, broken-away view of one end of the assembly shown in FIG. 2, showing some insulated wire strands in slots in a receiver.
FIG. 11 is an enlarged, exploded, perspective, broken-away view of one end of the assembly shown in FIG. 10, showing insulated wire strands in slots in the receiver.

Another insulated wire strand 51 is strong between said supports 8 and 8a in a similar manner to that described terminting in different insulated receiver slots 26d and 26f shown in FIG. 2 and FIG. 9.

The rest of the winding is wound in a similar manner to that described between said supports 8 and 8a.

A cross connection 79, which is an insulated wire strand, is shown strung over part of the winding close to said receiver 24. Each end 79a and 79b of said cross connection 79 is inserted into partly occupied insulated receiver slots such as 26a and 26f. The purpose of said cross connection 79 is to provide an alternate electrical current path from one coil end to another coil end.

One end of each of said insulated line leads 78, L1 and L2 electrically connects to an electric supply source, not shown, if the dynamo is a motor, or to the load, not shown, if the dynamo is a generator. The other ends of each said line lead 78, L1 and L2, are inserted into three separate insulated receiver slots, such as said insulated receiver slot 26f for said line lead end 78a in FIG. 2. This dynamo will have two or more line leads.

Said retainer 28 shown in FIG. 2 is placed tightly and securely over all insulated wire strands between said receiver 24 and said inner ring 12.

The electrical connection is performed by fusing or in any well known manner, thus electrically connecting all insulated wire strands in each insulated receiver slot. For example, as shown in FIG. 2, said insulated wire strand end 50a and said cross connection end 79a are electrically connected together as by fusing. Since only two strand ends are shown in said insulated receiver slot 26a, the electrical connection is completed for said insulated receiver slot 26a only.

The wound inner stator assembly is finally enclosed by the outer stator, thus completing the dynamo shown in FIG. 2.

Figure 10:
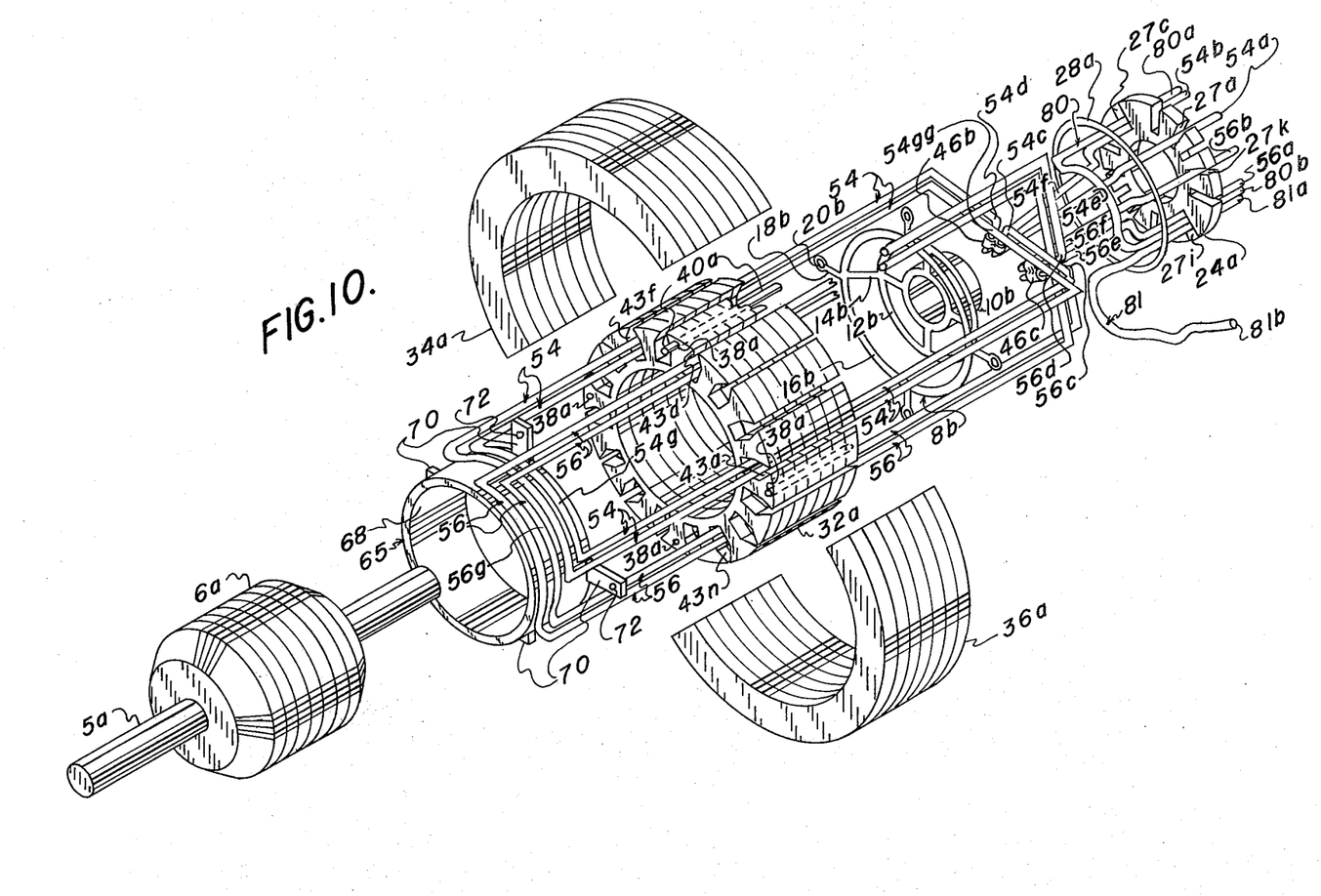
FIG. 10 is a modification of my assembly having a different support opposite the receiver side that permits removal of the rotor.

As illustrated in FIG. 10, the modified dynamo has only one single end chord span side thereby having basically one half the wire savings in comparison with the dynamo shown in FIG. 2. This modified dynamo having the receiver 24a on the chord span side has a shaft 5a on which a rotor 6a is fixed. This receiver 24a is fixed on said hub 10b.

Said rotor 6a is not finally enclosed by the inner stator 32a since it can be removed away from the stationary machine parts through an opening 68 of a winding support 65 on the non-chord span side of the dynamo. A clearance between said rotor 6a and inner stator 32a permits said removal. At one portion of said inner stator 32a is a winding support 8b, similar to said support 8 having a hub 10b inwardly of which is an inner ring 12b joined to said hub 10b by angular connector arms 14b which continue to a peripheral rim 16b. Said arms 14b also have extension portions 18b beyond said rim 16b which have holes 20b therethrough. Said shaft 5a rotatably extends through said hub 10b. A wire receiver ring 24a has insulated peripheral slots such as 27a to receive insulated wire strands later referred to. A retainer 28a encircles and retains insulated wire strands such as 54 in said insulated slots such as 27a.

A stator is composed of said inner stator 32a and an outer stator shown formed by two sections 34a and 36a that removably embrace said inner stator 32a. Around the peripheral surface of said inner stator 32a are relatively deep insulated grooves or slots such as 43a, later referred to.

Integral with said support 65 are angular arms 70 through which holes 72 extend and which receive joiner rods 40a from said inner stator 32a, only one of which is shown.

Said joiner rods 40a similar to said joiner rods 40, are so insulated they carry no current. They are inserted into holes 38a in said inner stator 32a and project out of said holes 38a and into said holes 72 and said holes 20b, thus assembling said inner stator 32a, said support 8b, and said support 65.

Both said winding supports 8b and 65 are retained at opposite ends against said inner stator 32a in any well known manner such as deformation of the projected ends of said joiner rods 40a against said arms 18b and said arms 70, or by adhesive between said inner stator 32a and both said arms 18b and 70.

The assembly shown in said FIG. 10 has both said winding supports 8b and 65 securely mounted to said inner stator 32a. Said wire receiver ring 24a is tightly fitted onto said hub 10b. In winding, this dynamo is wound in a similar manner as the dynamo shown in said FIG. 2. The difference is, said winding support 65 replaces said winding support 8a.

In winding, an insulated wire strand 54 commences in a taut manner at one end portion 54a adjacent to but separated from said receiver 24a, being firmly held in a well known way as by an exterior clamp, not shown. Said strand 54 is laid in and extends through an insulated inner stator slot 43a and extends over, in a general arcuate manner, said winding support 65 at the axial end portion of said inner stator 32a, as shown at 54g, then into another inner stator slot 43f. Said strand 54 passes over said peripheral rim 16b, then over said inner ring 12b by said hub 10b in a chord like manner as shown at 54gg, then it returns back over another portion of said inner ring 12b and another portion of said rim 16b and then returns through said stator slot 43a to said winding support 65. Thereafter this winding is repeated until sufficient winding has passed through said insulated slots such as 43a and 43f respectively. For example, there may be 15 insulated strand turns in said insulated stator slots such as 43a and 43f, constituting a coil. Insulated wire strands such as 54 can be located in more than two insulated stator slots.

When sufficient winding of said insulated wire strand 54 is completed, the finish end 54b is held taut while it is cut from a wire source, not shown, but similar to said wire source 48 shown in FIG. 4.

The next step in turn is to bring physically and tautly together, but not electrically, two insulated wire strand portions 54c and 54d of said insulated strand 54 and secure them tautly together by a clamp 46b, or they may be taped together.

Insulated wire strand portions 54e and 54f of said insulated wire strand 54 are laid over said inner ring 12b. Then insulated wire ends 54a and 54b are individually inserted into insulated receiver slots 27a and 27c respectively, as shown in FIG. 10.

Another insulated wire strand 56 is strung between said supports 8b and 65 in a similar manner to that described, terminating in different insulated receiver slots 27i and 27k shown in FIG. 11.

The rest of the winding is wound in a similar manner to that described between said supports 8b and 65.

A cross connection 80, which is an insulated wire strand, may be strung over part of the winding close to said receiver 24a. Each end 80a and 80b of said cross connection 80 is inserted into partly occupied insulated receiver slots such as 27c and 27i. The purpose of said cross connection 80 is to provide an alternate electrical current path from one coil end to another coil end.

One end 81b of an insulated line lead 81 will electrically connect to an electric supply source, not shown, if the dynamo is a motor, or to the load, not shown, if the dynamo is a generator. The other end 81a of the line lead 81 is inserted into an insulated receiver slot such as 27i in FIG. 10, and terminates there. This dynamo will have two or more line leads.

Said retainer 28a shown in FIG. 10 is placed tightly and securely over all insulated wire strands between said receiver 24a and said winding support 8b.

The electrical connection is achieved by fusing or in any well known manner, to electrically connect all insulated wire strands in each said insulated receiver slot. For example, as shown in FIG. 10, said insulated wire strand end 54b and said cross connection end 80a are electrically connected as by fusing. Since only two strand ends are shown in said insulated receiver slot 27c, the electrical connection is completed by fusing them.

The wound inner stator assembly is finally enclosed by the two outer stator sections 34a and 36a thus completing the dynamo, shown in said FIG. 10.

Figure 12:
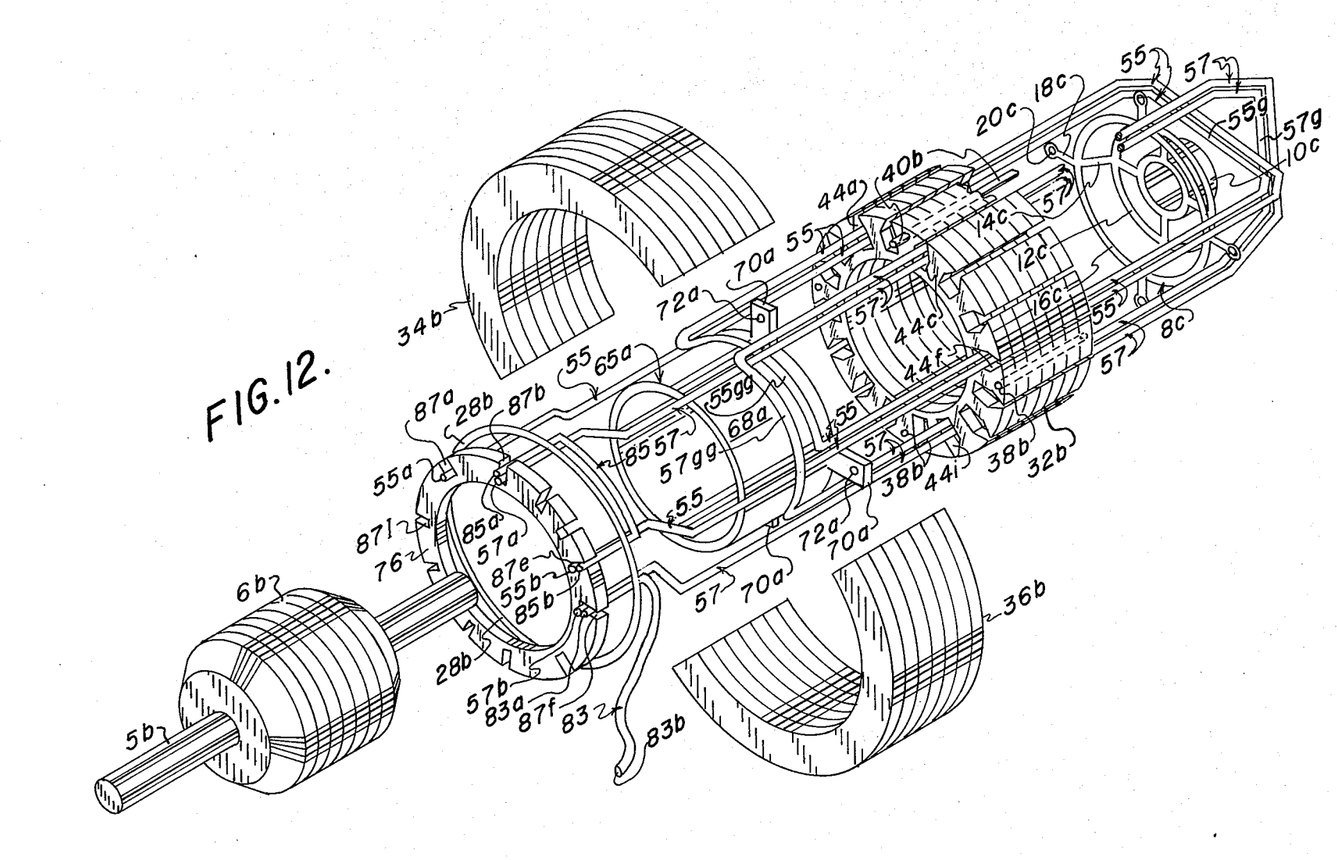
FIG. 12 is another view somewhat similar to FIG. 10; but showing a different and enlarged receiver at one end opposite the chord span side with a different method of strand insertion in the enlarged receiver.

As illustrated in FIG. 12, another modified dynamo, having only one chord span side, has an enlarged receiver ring 76 mounted on a winding support 65a that removably receives a rotor 6b.

Integral with said winding support 65a are angular arms 70a in which are holes 72a therethrough to receive joiner rods 40b, only one of which is shown.

Said winding support 65a permits removal of said rotor 6b which is mounted on a shaft 5b. Said wire receiver ring 76, which is similar to said receiver ring 24 except for having an inner diameter slightly larger than the diameter of said rotor 6b, has insulated peripheral slots such as 87a to receive insulated wire strands later referred to. A clearance exists between said rotor 6b and an inner stator 32b.

One portion of said inner stator 32b is a winding support 8c, similar to said support 8, having a hub 10c inwardly of which is an inner ring 12c joined to said hub 10c by angular connector arms 14c which continue to a peripheral rim 16c. Said arms 14c also have extension portions 18c beyond said rim 16c which have holes 20c therethrough. Said shaft 5b rotatably extends through said hub 10c. A retainer 28b encircles, and retains insulated wire strands such as in said insulated receiver slot 87a.

A stator is composed of said inner stator 32b and an outer stator shown formed by two sections 34b and 36b that removably embrace said inner stator 32b. The latter rotatably receives said rotor 6b. Around the peripheral surface of said inner stator 32b are relatively deep insulated grooves or slots such as 44a later referred to.

Joiner rods, such as rod 40b are so insulated they carry no current. They are inserted into holes 38b in said inner stator 32b and will project out of said holes 38b and into both said holes 20c and 72a in the completed assembly to thus assemble said inner stator 32b, said support 8c and said support 65a.

Both said winding supports 8c and 65a are retained against said inner stator 32b in any well known manner such as deformation of the projected ends of said joiner rods 40b against said arms 18c and 70a, or by adhesive between said inner stator 32b and both said arms 18c and 70a.

The assembly shown in said FIG. 12 has both said winding supports 8c and 65a securely mounted to said inner stator 32b. Said wire receiver ring 76 is tightly fitted onto the outer surface 68a of said support 65a.

In winding shown in said FIG. 12, an insulated wire strand 55 commences in a taut manner at one end portion 55a from a position adjacent to, but separated from said receiver 76, being firmly held in a well known way, as by an exterior clamp, not shown; or held by friction in said insulated receiver slot 87a. Said insulated wire strand 55 is laid in and extends through an insulated inner stator slot 44a and over said peripheral rim 16c, over a portion of said inner ring 12c, then by said hub 10c in a chord-like manner as shown at 55g. Then in returning it passes over another portion of said inner rim 12c and another portion of said peripheral rim 16c and in an insulated inner stator slot 44f. Then it passes, in an arcuate manner over said outer surface 68a at the axial end portion of said inner stator 32b, as shown at 55gg, then returns through said insulated inner stator slot 44a to said rim 16c. Thereafter this winding is repeated until sufficient winding has passed through said insulated inner stator slots such as 44a and 44f. For example, there may be 15 strand turns in said inner stator slots such as 44a and 44f, constituting a coil.

When sufficient winding of said strand 55 is completed, the finish end 55b is firmly held taut while it is cut from a wire source not shown, but similar to said wire source 48 shown in FIG. 4 either before or after being inserted into insulated receiver slot 87e. The portion of said insulated wire strand 55 between said inner stator 32b and said receiver ring 76 lies over said winding support 65a in a taut manner.

Another insulated wire strand 57 is strung between said supports 8c and 65c in a similar manner to that described for strand 55, terminating in different insulated receiver slots 87b and 87f.

The rest of the winding is wound in a similar manner to that described between said supports 8c and 65a.

A cross connection 85, which is an insulated wire strand, may be strung over part of the winding close to said receiver 76. Each end 85a and 85b of said cross connection 85 is inserted into partly occupied receiver slots such as 87b and 87e respectively. The purpose of said cross connection 85 is to provide an alternate electrical current path from one coil end to another coil end.

One end 83b of an insulated line lead 83 electrically connects to an electric supply source, not shown, if the dynamo is a motor or to the load not shown if the dynamo is a generator. The other end 83a of insulated line lead 83 is inserted into an insulated receiver slot such as 87f in FIG. 12. This dynamo will have two or more line leads, such as 83.

Said retainer 28b shown in FIG. 12 is tightly placed and securely over all insulated wire strands between said receiver 76 and said arms 70a.

The electrical connection is achieved by fusing or in any well known manner, to thus electrically connect all insulated wire strands in each insulated receiver slot. For example, as shown in FIG. 12, an insulated wire strand end 57a and said cross connection end 85a are electrically connected as by fusing. Since only two of said strand ends 57a and 85a are shown in said insulated receiver slot 87b, the electrical connection is completed for this said insulated receiver slot 87b.

The wound inner stator assembly is finally enclosed by the outer stator sections 34b and 36b, thus completing the dynamo shown in said FIG. 12.

The dynamos shown in said FIG. 10 and 12 have the advantage that the rotor may be removed after the winding is completed, which is advantageous in a direct current or wound rotor dynamo having brushes.

The dynamo shown in said FIG. 2 has the advantage that the saving in winding is substantial because the chord-span winding can be achieved at both ends.

What I claim is:

1. A dynamoelectric machine comprising a shaft, a rotor fixed thereto, a sectional stator having an inner stator and an outer stator, said rotor and shaft rotatably extending into said inner stator and said inner stator having exterior slots, first and second winding support means located at opposite ends of and connected to said inner stator, wire strands extending (a) from and between both of said winding support means and into said inner stator slots and (b) from and between two of said slots at one end of said inner stator and laterally in the form of a chord making contact with two different portions of said first winding support means, said two portions being spaced inwardly from the periphery of said first winding support means and being closer to said shaft than is the inner circumference of said inner stator, and a receiver extending over and in contact with the outer surface of one of said winding support means, said receiver having slots for receiving the ends of said wire strands when the winding thereof is terminated.

2. A dynamoelectric machine as set forth in claim 1, said first winding support means having an inner ring spaced inwardly from the periphery thereof, the said two different portions of said first winding support means being portions of said inner ring.

3. A dynamoelectric machine as set forth in claim 2 wherein said first winding support means has a peripheral rim and connector arms joining said inner ring to said peripheral rim.

4. A dynamoelectric machine as set forth in claim 2 wherein said first winding support means has a hub and said shaft rotatably extends into said hub.

5. A dynamoelectric machine as set forth in claim 4 further including connector arms joining said inner ring to said hub.

6. A dynamoelectric machine as set forth in claim 5 including a peripheral rim disposed outwardly of said inner ring, additional connector arms extending from said inner ring to said peripheral rim, said rim having extension portions extending peripherally outward and having holes therethrough, and connecting rods extending from said inner stator into said holes and connecting said winding support means to said inner stator.

7. A dynamoelectric machine as set forth in claim 1, said outer stator comprising a plurality of separable sections that collectively embrace said inner stator.

8. A dynamoelectric machine as set forth in claim 1 wherein said second winding support means has an opening through which said rotor is removable from within said inner stator, and further including a receiver ring on the periphery of said second winding support means having slots to receive the ends of said strands when the winding thereof is terminated.

9. A dynamoelectric machine comprising a shaft, a rotor assembly fixed to said shaft for rotation therewith, a sectional stator assembly comprising an annular inner stator surrounding said rotor and an outer stator surrounding said inner stator, said shaft and rotor being rotatable relative to said inner stator, said inner stator and said outer stator having mutually confronting outer and inner cylindrical surfaces respectively with a plurality of circumferentially-spaced longitudinally-extending slots formed in the said outer surface of said inner stator, first and second winding supports located at opposite ends of said stator assembly in concentric and spaced relation with said shaft, means connecting each of said winding supports to said inner stator, at least one coil winding for said stator assembly, said coil winding comprising first wire portions that extend along said slots lengthwise of said stator assembly from one to the other of said wire supports and second and third wire portions continuous with said first wire portions that extend laterally of said stator assembly beyond the ends of said rotor in the form of a chord of a circle that is concentric with said shaft and has a circumference which is smaller than the inner circumference of said inner stator, said second and third wire portions being in contact with said first and second winding supports respectively.

* * * * *